United States Patent [19]
Thornberg et al.

[11] Patent Number: 6,076,024
[45] Date of Patent: Jun. 13, 2000

[54] EARTH-REFERENCED WIND ADJUSTMENT FOR HOVERING AIRCRAFT

[75] Inventors: Christopher A. Thornberg, Newton; Bryan S. Cotton, Monroe, both of Conn.

[73] Assignee: Sikorsky Aircraft Corporation, Stratford, Conn.

[21] Appl. No.: 09/069,320

[22] Filed: Apr. 29, 1998

[51] Int. Cl.[7] ............................................... G06F 17/00
[52] U.S. Cl. .................................. 701/4; 701/7; 701/120; 244/17.13; 244/76 R
[58] Field of Search ........................ 701/3, 4, 5, 7, 701/8, 9, 10, 11, 14, 15, 16; 244/181, 178, 177, 76 R, 17.13, 17.21, 158 R, 164, 171, 17.11, 180; 340/978, 989, 940

[56] References Cited

U.S. PATENT DOCUMENTS

| | | | |
|---|---|---|---|
| 4,151,595 | 4/1979 | Pressiat | 701/3 |
| 4,536,843 | 8/1985 | Lambregts | 701/3 |
| 4,646,243 | 2/1987 | Graupp et al. | 701/120 |
| 4,829,441 | 5/1989 | Mandle et al. | 701/3 |
| 4,970,651 | 11/1990 | Favre et al. | 701/4 |
| 5,169,090 | 12/1992 | Wright et al. | 701/5 |
| 5,195,039 | 3/1993 | Gold et al. | 701/7 |
| 5,195,700 | 3/1993 | Fogler, Jr. et al. | 701/5 |
| 5,213,282 | 5/1993 | Gold et al. | 701/5 |
| 5,213,283 | 5/1993 | Gold et al. | 701/7 |
| 5,222,691 | 6/1993 | Gold et al. | 701/7 |

*Primary Examiner*—Jacques H. Louis-Jacques
*Attorney, Agent, or Firm*—M. P. Williams

[57] ABSTRACT

In a rotary wing aircraft, longitudinal groundspeed error and lateral groundspeed error are converted to earth coordinates, and the result scaled and integrated, and retransformed into aircraft coordinates for application to a pitch attitude control system and a roll attitude control system. The invention thus instantly transfers wind trim between the longitudinal and lateral channels, whenever a heading change is undertaken.

3 Claims, 2 Drawing Sheets

EARTH-REFERENCED WIND ADJUSTMENT FOR HOVERING AIRCRAFT

TECHNICAL FIELD

This invention relates to providing constantly-updated integrations of longitudinal and lateral groundspeed errors as inputs to an automatic flight control system, thereby to instantly compensate for wind and variations in the direction and magnitude of wind.

BACKGROUND ART

Methods for implementing automatic hover hold control systems known to the prior art rotary wing aircraft utilize completely independent control channels for the pitch and roll axes. To effect a heading change, the aircraft will rotate in the yaw axis. Since there is no advance information concerning what wind correction will be required for various heading orientations, the pitch and roll control channels do not respond until there are either velocity or position errors sufficient to cause a response. The lag between the occurrence of a change in heading, and therefore an accompanying change in the relative direction of wind impinging on the aircraft, together with the delay in the aircraft responding to the change in aircraft velocity and position, as a consequence of the pitch and lateral wind trims not changing when the relative direction of the wind to the aircraft changes as a consequence of a change in aircraft heading, all accumulate to introduce significant errors in position whenever a heading change is made during a hover maneuver. As a result, the aircraft may drift significantly from the desired hover position during heading changes, and typically will require repositioning, either manually or automatically.

DISCLOSURE OF INVENTION

Objects of the invention include providing for improved automated heading changes during hover of a rotary wing aircraft, reducing the effect of wind when changing heading of an aircraft in flight, and providing for minimal positional error resulting from heading changes executed by a rotary ring aircraft during hover in wind.

According to the present invention, groundspeed counters in both the longitudinal, pitch attitude command channel and the lateral, roll attitude command channel of an automatic flight control system are resolved into earth coordinates and integrated with a scaling factor to provide a north attitude wind adjustment signal and an east attitude wind adjustment signal (or the like), which are indicative of the accumulated trim required to neutralize the wind, and these signals are retransformed into vehicle coordinates (pitch and roll) and summed into the longitudinal and lateral, respectively, control channels. In accordance with the invention, as a vehicle yaws, the components of required wind adjustment are transferred from the roll channel to the pitch channel, and vice versa, as necessary, to compensate for the wind.

The present invention may be implemented with analog circuitry, and in fact is described in functional block form, but the invention is preferably implemented in a suitably programmed flight control computer, having functional capabilities similar to any suitable popular personal computer, utilizing mathematical algorithms and other subroutines which are well known in the art. The invention has the advantage of automatically adjusting for heading, the components of wind-compensating trim. The invention has the additional advantage of benefiting a position hover hold control function, which generates velocity commands to the velocity hold control laws in order to control aircraft position. The invention is effective without any independent knowledge about actual wind conditions (that is, earth-referenced, sensed wind information), since it simply matches the commanded pitch or roll to the actual pitch or roll, which can only be caused by wind.

With the invention, an aircraft which is trimmed with respect to wind in a given heading will remain trimmed with respect to the same wind, degree by degree, as the heading is changed.

Other objects, features and advantages of the present invention will become more apparent in the light of the following detailed description of exemplary embodiments thereof, as illustrated in the accompanying drawing.

BEST MODE FOR CARRYING OUT THE INVENTION

The present invention is described as it would apply to an unmanned aerial vehicle of the type generally referred to in commonly owned U.S. Pat. Nos. 5,058,824, 5,150,857, 5,429,089, 5,552,983, and 5,676,334, all of which are incorporated herein by reference. That vehicle is generally toroidal in shape, having counterrotating, variable pitch blade rotors, coaxially driven within the center of the toroid. This vehicle has a very significant airspeed vs. attitude relationship, which is on the order of 5° vehicle attitude for every 10 knots of airspeed. Due to the essentially symmetrical fuselage, the moments generated by the shroud of the vehicle will be the same in response to lateral air speed as it is in response to a longitudinal air speed.

Figure 1:
FIGS. 1–4 illustrate the effects of wind trim on a heading change having independent pitch and roll wind trim, according to the prior art.
Figure 2:
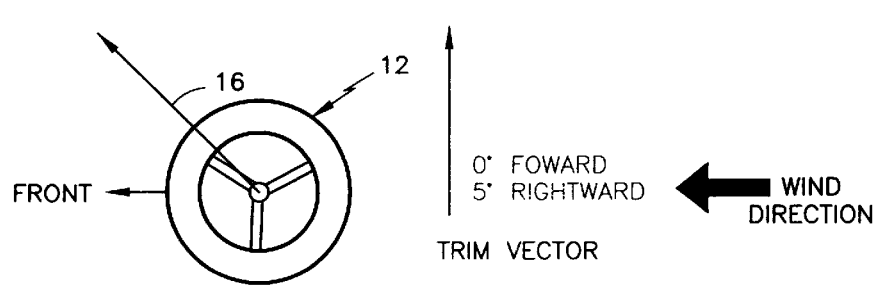
Figure 3:
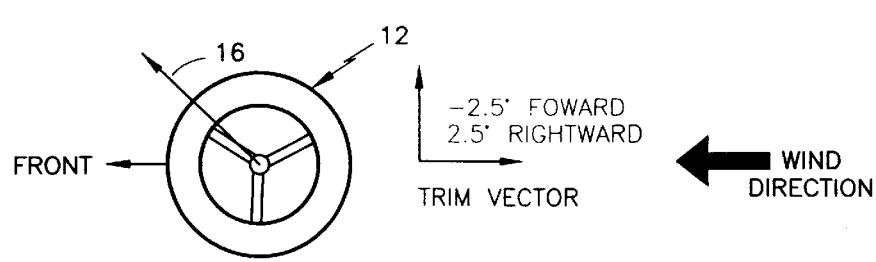
Figure 4:
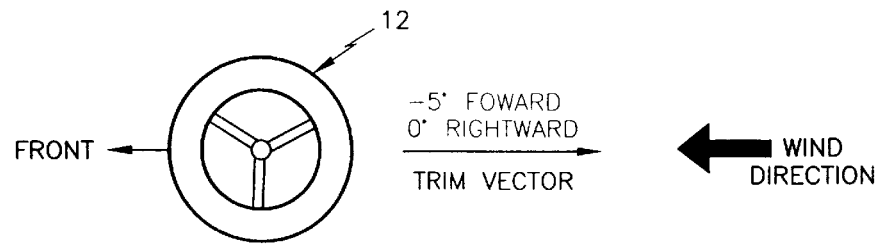

Referring to FIG. 1, an exemplary vehicle 12 has a generally toroidal fuselage 13 which also comprises the shroud for the rotors 14. In FIG. 1, the vehicle 12 is in hover with its heading due north in a ten knot easterly wind. In order to remain stationary, the vehicle requires a ten knot easterly air speed. This is accomplished with a right lateral (or roll) attitude correction of 5°, and a longitudinal attitude correction of 0°. In FIG. 2, the vehicle is shown to have changed its heading from north to west. For illustrative purposes, it is assumed that the vehicle completed the heading change substantially instantaneously, although in practice that will not be the case. In any event, initially, the attitude correction for wind on the aircraft has not changed, remaining 0° forward and 5° rightward, which now causes 10 knots of northward flight (to the right of the vehicle) and 10 knots of forward flight induced by the wind. A combination of wind and rightward trim causes the vehicle 12 to accelerate northwesterly as shown by the vector 16. In this condition, there is no aft attitude correction trim to compensate for the wind, and there continues to be essentially a rightward trim, which is undesired. In FIG. 3, the independent roll and pitch trim channels begin to compensate for the heading change into the westerly wind. Assuming that each has changed by 2.5°, including a −2.5° forward trim, which is an aft trim to compensate for the wind, and a 2.5° rightward trim which is a reduction from the original 5° rightward trim, the aircraft still drifts in the direction of the arrow 16, although it is slowing down. In FIG. 4, all of the trim has been transferred from the roll channel to the pitch channel, so that there is a 5° aft trim and no lateral trim. However, in the time it takes to accomplish the transfer of the wind trim from one channel to the other, the drift in position may be quite large.

Figure 5:
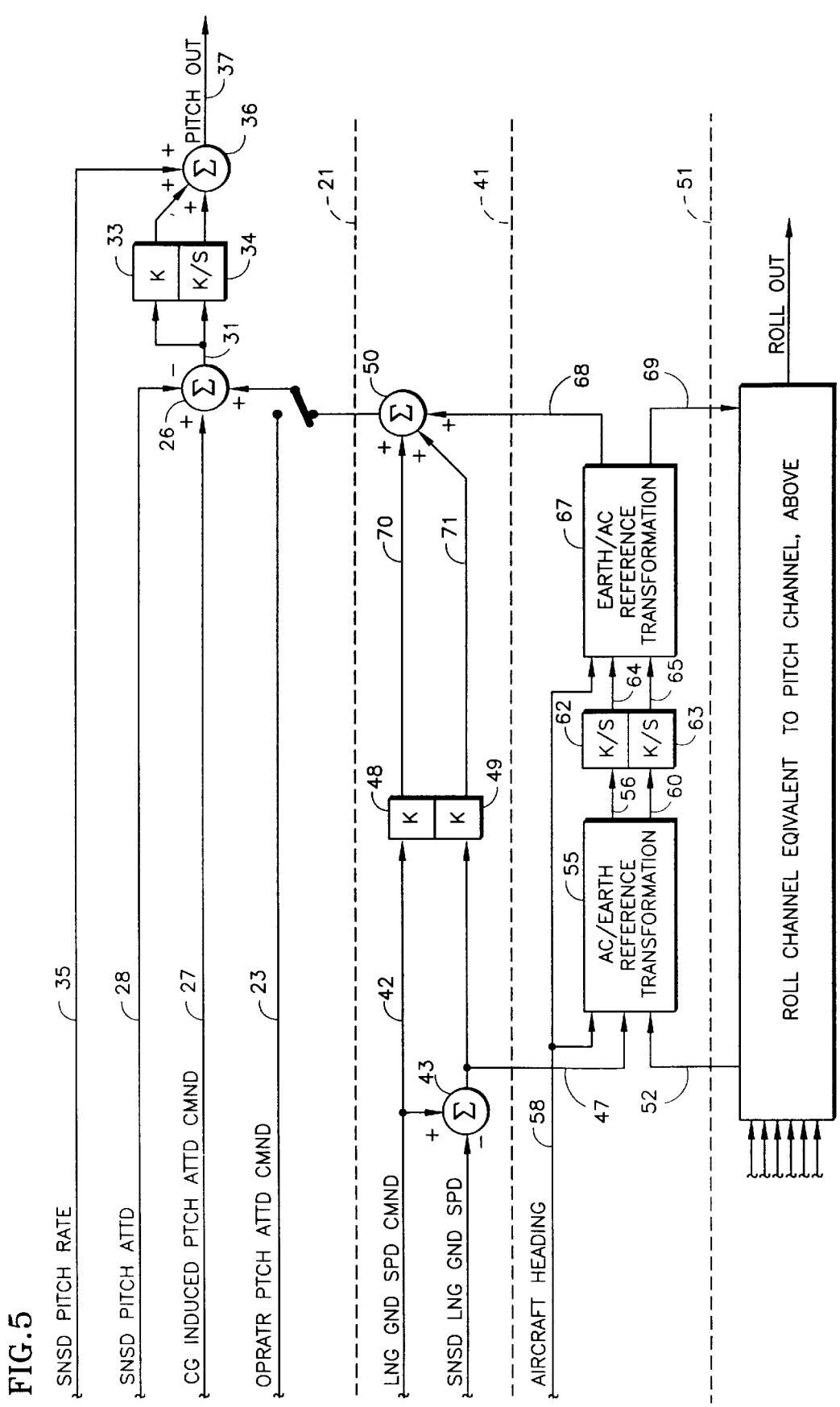
FIG. 5 is a functional block diagram illustrating the invention.

Referring to FIG. 5, the functions shown above the dashed line 21 illustrate a conventional pitch attitude control system which, when a switch 22 is in the position opposite to that shown, will control the pitch (longitudinal) attitude of the vehicle in response to an operator pitch attitude command on a line 23. The pitch attitude command is summed in a summer 26 with a center of gravity induced (CG) pitch attitude command on a line 27 and the sensed pitch attitude on a line 28. The CG pitch attitude command compensates for variations in the actual position of the vehicle center of gravity, which is always forward for stability; the variation results mainly from fuel burn. The CG pitch attitude command is relatively small, and over any reasonably short period of time can be considered to be a constant. The output of the summer 26 on a line 31 comprises a pitch attitude error which is passed through proportional and integral paths 33, 34, respectively, the outputs of which are summed with a sensed pitch rate on a line 35 in a summer 36 to provide the pitch channel control output on a line 37.

During automated flight, and particularly during automated hover control, the switch 22 will be in the position shown in FIG. 5 thereby providing a pitch attitude command from a velocity hold control system which comprises the functions disclosed between the dash line 21 and the dash line 41 in FIG. 5. A longitudinal groundspeed command is provided on a line 42 to a summer 43, the other input to which is the sensed longitudinal groundspeed on a line 44, such as may be provided by a global-positioning-system-based inertial system. The output of the summer 43 comprises a longitudinal groundspeed error on a line 47. The longitudinal speed command and the longitudinal groundspeed error are scaled in proportional channels 48 and 49 and applied to a summer 50.

All of the apparatus thus described above the dash line 41 is also provided in a roll channel illustrated below the dash line 51. Thus the roll channel provides a lateral groundspeed error signal on a line 52.

According to the invention, the lateral and longitudinal groundspeed errors are transformed from aircraft coordinates to earth coordinates and integrated, the integration continuing until the desired groundspeed is reached, which in hover is zero velocity. In FIG. 5, an aircraft/earth reference transformation 55 is accomplished by providing a north velocity error on a line 56 which is equal to the longitudinal velocity error times the cosine of the true heading of the vehicle, as indicated on a line 58, minus the lateral velocity acceleration times the sine of the true heading of the vehicle. And, an east velocity error on a line 60 is equal to the longitudinal velocity error times the sine of the true heading plus the lateral velocity error times the cosine of the true heading. The earth referenced errors are scaled and integrated in paths 62, 63, so as to provide signals on lines 64 and 65 which represent complete north and east wind compensation, in earth referenced coordinates. Then, these trim values are returned to aircraft coordinates by earth/aircraft reference transformation 67, which provides a pitch attitude wind adjustment signal on a line 68 equal to the negative of the sum of: the north attitude wind adjustment times the cosine of the true heading with the east attitude wind adjustment times the sine of the true heading. The earth/vehicle transformation 67 provides a roll attitude wind adjustment signal on a line 69 as the east attitude wind adjustment times the cosine of the true heading minus the north attitude wind adjustment times the sine of the true heading.

The pitch attitude wind adjustment on the line 68 is provided to the summer 50 along the with scaled longitudinal groundspeed command and the scaled longitudinal groundspeed error on lines 70, 71. In hover, on target, the longitudinal groundspeed command will be zero velocity, and the sensed longitudinal groundspeed should normally be zero velocity except during wind gusts (changes in intensity or direction) or during a heading change maneuver. Thus, in steady state, the output of the summer 50 will simply be the longitudinal pitch attitude wind adjustment on the line 68. The roll channel is identical to the pitch channel, except that it responds to, and provides signals relating to the roll axis.

An aircraft employing the invention of FIG. 5 which undergoes any change in heading will immediately cause a corresponding transfer between the pitch attitude wind adjustment and the roll attitude wind adjustment, which includes aircraft/earth reference transformation at the new heading, integration of the differences resulting from the new heading, and transformation back into aircraft coordinates. Thus, there is no need for the system to await a speed variation, which will integrate into a positional error, before adjusting for the change in heading.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of providing attitude wind adjustment in an aircraft, comprising:

providing, in aircraft coordinates, a longitudinal groundspeed command signal indicative of a commanded longitudinal groundspeed;

providing, in aircraft coordinates, a sensed longitudinal groundspeed signal indicative of actual longitudinal groundspeed of the aircraft;

providing, in aircraft coordinates, a lateral groundspeed command signal indicative of a commanded lateral groundspeed;

providing, in aircraft coordinates, a sensed lateral groundspeed signal indicative of actual lateral groundspeed of the aircraft;

providing a longitudinal groundspeed error signal having a magnitude indicative of the difference between the speed indicated by said longitudinal groundspeed command signal and the speed indicated by said sensed longitudinal groundspeed signal;

providing a lateral groundspeed error signal indicative of the difference between the groundspeed indicated by said lateral groundspeed command signal and the speed indicated by said sensed lateral groundspeed signal;

providing a true heading signal indicative of the true heading of the aircraft in earth coordinates;

providing, in earth coordinates, a north velocity error signal equal to: (a) the magnitude of said longitudinal groundspeed error signal times the cosine of the heading indicated by said true heading signal, minus (b) the magnitude of said lateral groundspeed error signal times the sine of the heading indicated by said true heading signal;

providing, in earth coordinates, an east velocity error signal equal to: (c) the magnitude of said longitudinal groundspeed error signal times the sine of the heading indicated by said true heading signal, plus (d) the magnitude of said lateral groundspeed error signal times the cosine of the heading indicated by said true heading signal;

scaling and integrating said north velocity error signal and said east velocity error signal to provide, respectively, a north attitude wind adjustment signal and an east attitude wind adjustment signal each with a corresponding magnitude;

providing, in aircraft coordinates, a pitch attitude wind adjustment signal equal to: (e) the negative of the magnitude of said north attitude wind adjustment signal times the cosine of the heading indicated by said true heading signal, summed with (f) the negative of the magnitude of said east attitude wind adjustment signal times the sine of the heading indicated by said true heading signal; and providing, in aircraft coordinates, a roll attitude wind adjustment signal equal to: (g) the magnitude of said east attitude wind adjustment signal times the cosine of the heading indicated by said true aircraft heading signal minus (h) the magnitude of said north attitude wind adjustment signal times the sine of the heading indicated by said true heading signal.

2. The method of providing wind compensation signals in an automatic flight control of an aircraft having a pitch attitude control channel and a roll attitude control channel, comprising:

providing longitudinal and lateral groundspeed error signals in aircraft coordinates;

transforming said longitudinal and lateral groundspeed error signals into earth referenced coordinates;

scaling and integrating said, transformed longitudinal and lateral groundspeed error signals in earth coordinates;

transforming said scaled and integrated longitudinal and lateral groundspeed error signals back into aircraft coordinates; and applying said transformed scaled and integrated longitudinal and lateral groundspeed error signals in aircraft coordinates to said pitch attitude control channel and said roll attitude control channel, respectively.

3. An automatic flight control system for an aircraft comprising:

a pitch attitude control channel;

a roll attitude control channel;

means for providing, in aircraft coordinates, a longitudinal groundspeed error signal indicative of a difference between a longitudinal groundspeed command and an actual longitudinal groundspeed;

means for providing, in aircraft coordinates, a lateral groundspeed error signal indicative of a difference between a lateral groundspeed command and an actual lateral groundspeed of the aircraft;

means for providing an actual aircraft heading in earth coordinates;

means responsive to the actual aircraft heading for converting said longitudinal groundspeed error signal and said lateral groundspeed error signal from aircraft coordinates to earth coordinates to provide a north velocity error signal and an east velocity error signal;

means for scaling and integrating said north velocity error signal to provide a north attitude wind adjustment signal;

means for scaling and integrating said east velocity error signal to provide an east attitude wind adjustment signal;

means for transforming said north attitude wind adjustment signal and said east attitude wind adjustment signal from earth referenced coordinates to aircraft reference coordinates to provide a pitch attitude wind adjustment signal to said pitch attitude control channel and to provide a roll attitude wind adjustment signal to said roll attitude control channel.

* * * * *